Jan. 14, 1947.
C. E. BENNETT ET AL
2,414,352
JOINT FOR ELECTRIC CABLES
Filed July 6, 1944
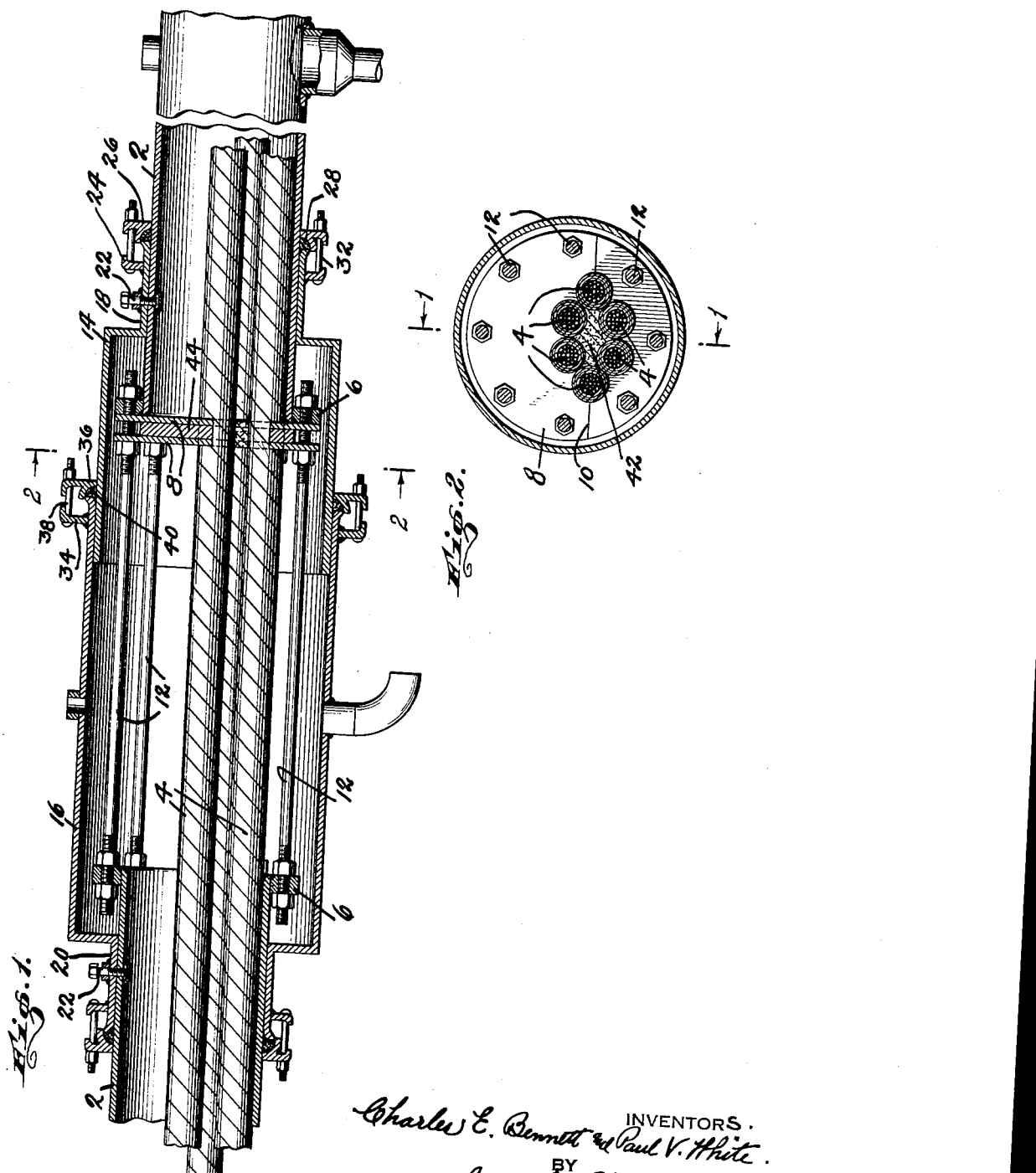
INVENTORS.
Charles E. Bennett and Paul V. White.
BY
James G. Bethell
ATTORNEY.

Patented Jan. 14, 1947

2,414,352

UNITED STATES PATENT OFFICE 2,414,352

JOINT FOR ELECTRIC CABLES

Charles E. Bennett, Ridgewood, and Paul V. White, Rochelle Park, N. J., assignors to The Okonite-Callender Cable Company, Incorporated, Paterson, N. J., a corporation of New Jersey Application July 6, 1944, Serial No. 543,692

4 Claims. (Cl. 174—23)

Our invention is directed to an improved cable joint, particularly adaptable for cable systems of the type wherein the cable conductors are loosely enclosed in a pipe line as distinguished from a close fitting sheath.

One of the objects of our invention is to provide a joint construction wherein cutting of the conductors in making up the joint is unnecessary.

In the drawing:

Fig. 1 is a sectional view on the line 1—1 of Fig. 2; and

Fig. 2 is a section on the line 2—2 of Fig. 1.

Referring to the drawing in detail: 2 designates the spaced ends of two oppositely extending lengths of a metal pipe line loosely enclosing the insulated cable conductors 4.

Welded to each of the pipe line ends 2 are steel rings 6.

8 designates a pair of metal barriers, bronze, for example, each split in two sections as shown at 10. The adjacent edges of each barrier at the split 10 are shaped so as to accommodate the conductors 4, whatever the disposition of the conductor assembly in the pipe line may be. This permits the two sections of each barrier to be slipped over the conductors laterally of the conductors, without necessitating cutting of the conductors.

The barriers are bored to receive tie rods 12 which extend from one ring 6 to the other lengthwise of the joint.

The casing of the joint comprises telescoping shells 14 and 16. The outer end of the shell 14 is reduced in diameter as shown at 18, but is capable of being slipped over the end of one of the pipe lengths 2. The larger diameter portion of shell 14 fits within the inner end of shell 16. The outer end of this latter shell is reduced in diameter as shown at 20 and fits over the end of the other pipe length 2.

To prevent movement of the casing shells upon the pipe lengths, locking pins 22 are passed through the joint shells and the pipe lengths.

Welded to reduced diameter section 18 of casing shell 14 is a ring 24. Clamping ring 26 loosely surrounds the pipe length adjacent the outer end of 18 and between this ring and the end of the section 18 is gasket 28 adapted to be compressed by setting up the bolts 32.

The outer end of the shell 16 is similar in construction so that it is unnecessary to describe it in detail. This provides a seal at each end of the joint casing.

A seal is provided in the joint casing where the shells 14 and 16 telescope each other by welding a ring 34 to shell 16 and by providing a loose clamping ring 36 on shell 14. By setting up the bolts 38 the gasket 40 between clamping ring 36 and the adjacent end of shell 16 a tight seal is provided.

In assembling this joint the casing shells are slipped over the ends of the lengths of pipe 2 and moved rearwardly sufficiently to permit the rings 6 to be welded in place, and the barriers 8 to be placed about the conductors. The rods 12 may then be placed in position and partially set up. Caulking of jute or other suitable material is then packed between the barriers 8 about the conductors as shown at 42, and then Wood's alloy 44—an alloy which melts at around 65° C. and hence is not injurious to the conductor insulation—is flowed into the space between the two barriers 8, and the rods 12 set up to their final setting, thereby to provide against the flow of any substantial quantity of oil or cable compound past the barriers.

The two casing shells may then be pushed forward on the pipe lengths, locking pins 22 inserted and bolts 32 and 38 tightened to complete the sealing of the joint.

It will be seen that our invention provides a semi-stop joint which is of simple construction and in which the barrier plates 8 are adapted to be placed in position without necessitating cutting of the cable conductors.

It is to be understood that changes may be made in the details of construction and arrangement of parts hereinabove described within the purview of our invention.

What we claim is:

1. In joints for cables wherein the cable conductors are enclosed in two aligned pipes having their inner ends spaced apart, the combination of a ring welded to the inner end of each pipe, tie rods joining said rings, and a pair of barrier plates for receiving the cable conductors extending across the joint adjacent the end of one of said pipes and clamped in position by said tie rods, each barrier plate being split in two sections to permit of its installation without cutting the cable conductors.

2. In joints for cables wherein the cable conductors are enclosed in two aligned pipes having their inner ends spaced apart, the combination of a ring rigidly mounted on the inner end of each of said pipes, a pair of barrier plates across the end of one of said pipes, said plates being split to enable the same to be installed about the cable conductors without necessitating cutting of the conductors, a low melting point metal caulking or packing between the plates and about the conductors where the latter pass through the plates, and tie rods extending from one of said rings to the other for tying the two pipes together and for holding said barrier plates in position with the said caulking under compression strain.

3. In joints for cables wherein the insulated cable conductors are enclosed in two aligned pipes having their inner ends spaced apart, the combination of a ring rigidly secured to the inner end of each of said pipes, barrier plates across the inner end of one of said pipes, each plate being divided transversely into two sections to permit installation without cutting said conductors, metal packing between said plates and about the conductors at the plates, and tie rods passing through the said rings and barrier plates for tying the pipes rigidly to each other and for placing the packing between the barrier plates under compression.

4. In joints for cables wherein the insulated cable conductors are enclosed in two aligned pipes having their inner ends spaced apart, the combination of a ring welded to each pipe, a pair of barrier plates across the inner end of one of said pipes, each of said plates being split transversely to permit of its installation so as to receive the cable conductors without necessitating cutting of the conductors, metal packing between the barrier plates and about the conductors, tie rods passing through said rings and said plates tying the pipes together and clamping the metal packing between the barrier plates, an outer casing for the joint enclosing the said inner pipe ends, and locking pins passing through the casing and the pipe ends for preventing movement of the casing on the pipe ends.

CHARLES E. BENNETT.
PAUL V. WHITE.